June 21, 1932.  A. H. EVRARD  1,864,236

FLUID CONTROL DEVICE FOR AIRCRAFT

Filed March 5, 1929   3 Sheets-Sheet 1

INVENTOR.
Alphonse H. Evrard

June 21, 1932.  A. H. EVRARD  1,864,236

FLUID CONTROL DEVICE FOR AIRCRAFT

Filed March 5, 1929   3 Sheets-Sheet 2

INVENTOR.
Alphonse H. Evrard

June 21, 1932. A. H. EVRARD 1,864,236

FLUID CONTROL DEVICE FOR AIRCRAFT

Filed March 5, 1929 3 Sheets-Sheet 3

Inventor:
Alphonse H Evrard

Patented June 21, 1932

1,864,236

UNITED STATES PATENT OFFICE

ALPHONSE HUBERT EVRARD, OF WILMINGTON, DELAWARE

FLUID CONTROL DEVICE FOR AIRCRAFT

Application filed March 5, 1929. Serial No. 344,354.

The invention relates to the particular use of a fluid action (gas or liquid) actuating some elements, bellows like and leak-proof, the connection between actuating and actuated bellows being made by the means of pipes.

The primary object of these elements is to actuate the control surfaces and other devices used in combination with flying machines, their application being intended rather in connection with all types of steering gears, either actuated by hand, mechanically or automatically.

The absolute tightness obtained by the means of such bellows instead of a joint or packing sealing a piston in its cylinder, renders more feasible and also more reliable all motion transmitters actuated by a fluid because there cannot be any leak by wear or by capillarity; such leaks in case of aircraft controls may put the system out of adjustment.

Some applications of bellows are shown in the drawings in combination with various controlling systems, but their uses are numerous and not limited to those shown thereby.

Figure 14:
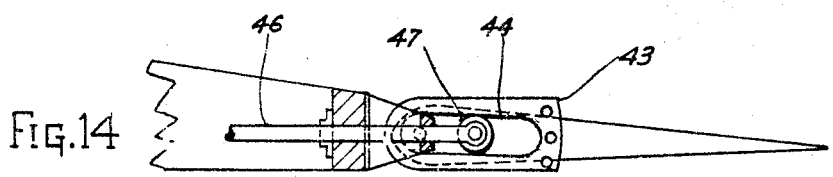
Figure 15:
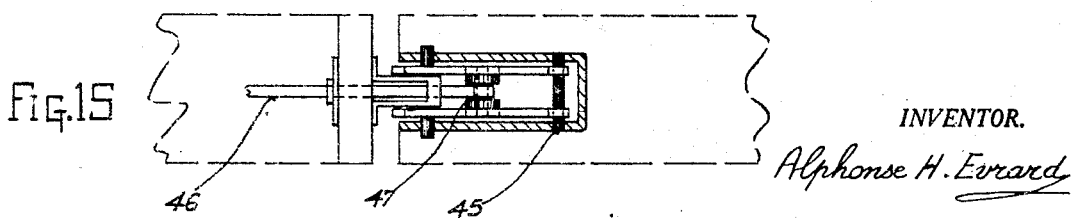

Figs. 14 and 15 are the section and plan view of a device for differential aileron control.

Fig. 16 is an assembly of such controls and a new tail mounting.

Figure 18:
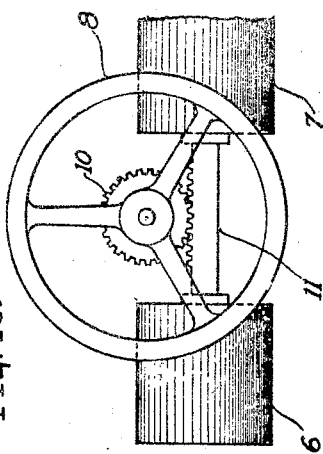
Figure 15:
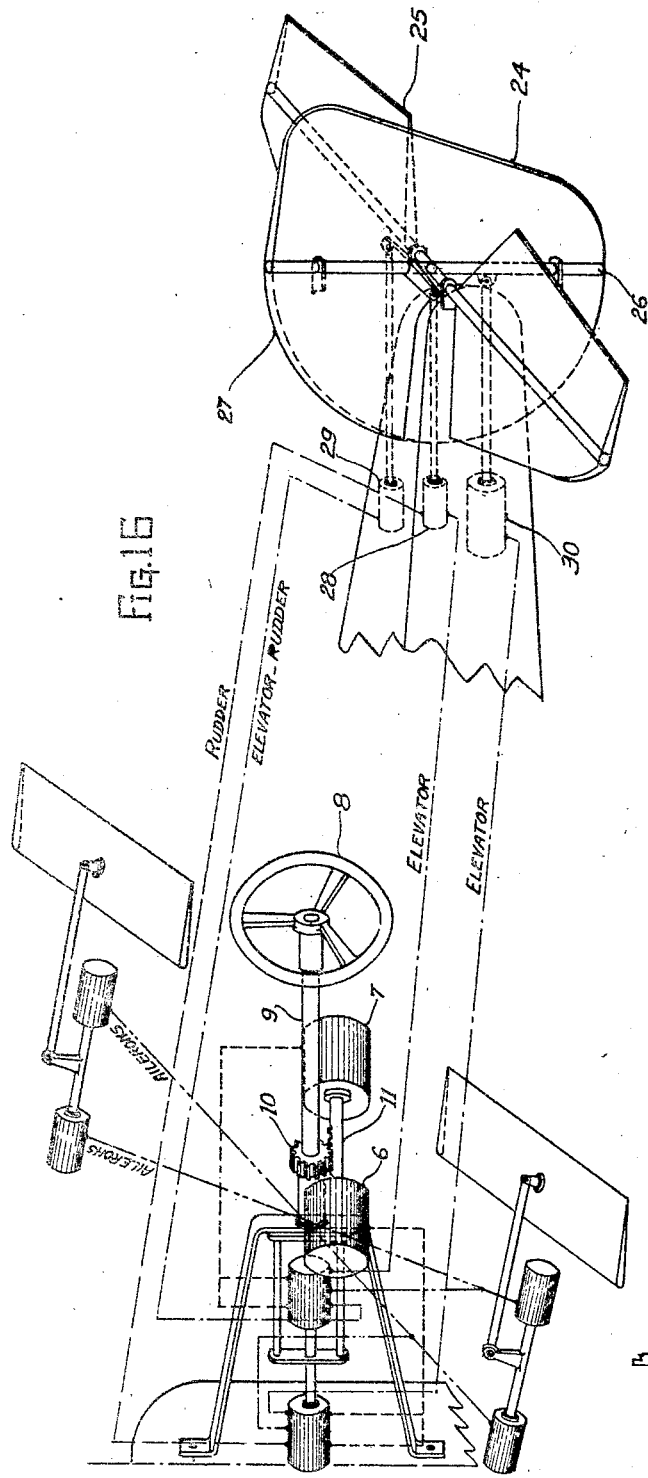
Figure 17:
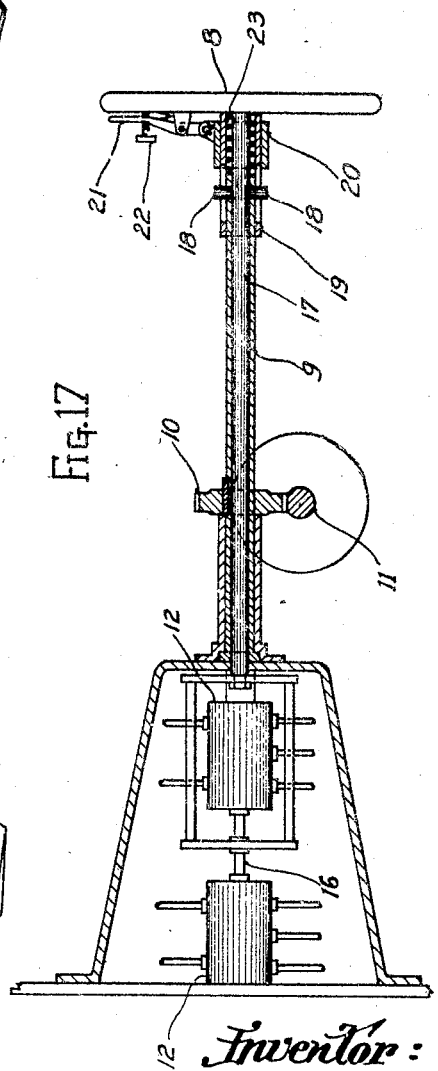

Figs. 17 and 18 are a section and end view of the aforesaid steering device.

Figure 1:
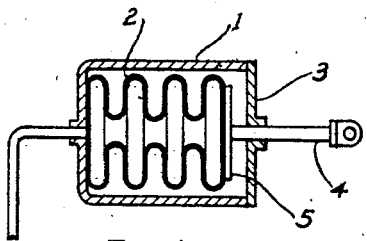
Figs. 1 and 2 are a section and end view of bellows working by compression and containing the fluid.
Figure 2:
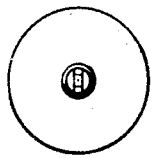
Figure 3:
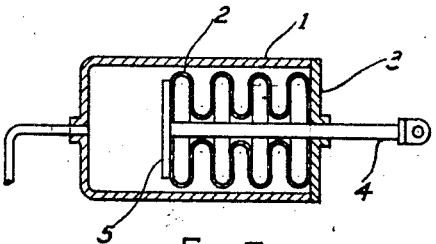
Fig. 3 is a section of bellows working by expansion.
Figure 4:
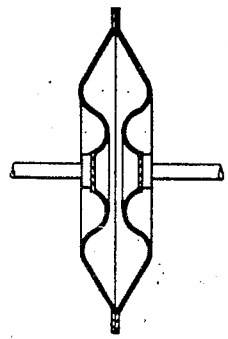
Figs. 4 and 5 are a section and plan view of another form of bellows made of concentrically corrugated halves and used whenever little movement or hard work is required.
Figure 5:
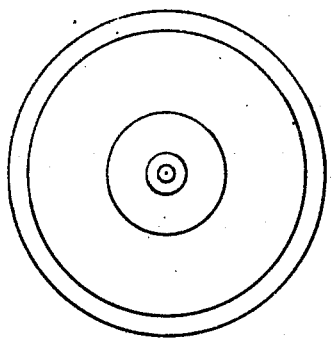
Figure 6:
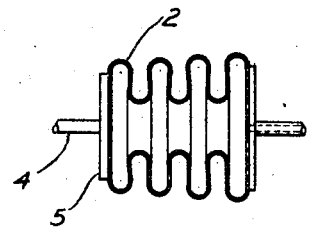
Fig. 6 shows another shape of bellows having more flexibility.

These bellows Figs. 1, 2 and 3 are made of a light container 1 in which a corrugated cylinder 2 expands or collapses, fluctuating its volume or that of the container and giving to the fluid a motion transmitted to like units located in the aircraft tail and wings as shown by Fig. 16. A cover 3 attached to the container is a guide for a rod 4 connected by a reinforcing plate 5 to the bellows, said rod receiving the hand or foot effort or reciprocally the fluid impulse.

This principle is not limited to the use of bellows made by forming convolutions in a tube or welding plates together, but an application of expansible and collapsible elements as in rubber can be made and leak-proofness obtained by covering the metal end parts with rubber and sealing with rubber gluing solution. For lightness purpose, the tubular longerons of the fuselage may be used as pipe lines.

Figure 8:
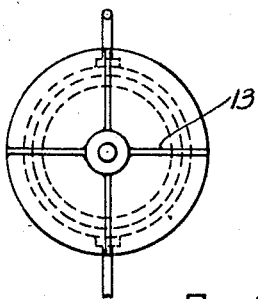
Figure 9:
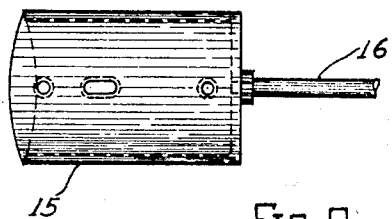
Fig. 9 is a view of the piston shutter used in that valve.

As an application of this principle, a steering device is shown in Figs. 16, 17 and 18 which presents the advantage to use only two main acting bellows and to uniformize if desired all efforts on the three bellow sets of an aircraft. For that purpose, as shown by Figs. 17 and 18, two main bellows 6 and 7 are acted upon toward right or left by the wheel 8, the spindle 9 of which is tubular and carries a toothed gear 10 meshing with a rack 11 connecting the bellows 6 and 7. The distribution of the impulse to the required control unit is accomplished with the help of a valve shown in detail by Figs. 7, 8 and 9; this valve is composed of a container and cover 12 and 13 in which the bellows 14 have only function to make a leak-proof system. A piston 15, connected by two rods 16 to these bellows can slide back and forth and close or open inlet and outlet orifices from which the pipe lines go to the required control units. Because there are right and left motions to operate the control surfaces, a double valve is here necessary. For better understanding, letters will represent the various orifices and reference will be made to them in the description.

The double valve used for the steering device is arranged in such a way that orifices in one part of the valve are open when those of the other part are closed, excepting the orifices cleared when the valve is in neutral position.

For each part of the valve, we shall designate by "a" the two inlet orifices connected by pipes to the main bellows 6 and 7, by "b" the orifice outlet on the fore side of the piston and connecting the valve to the elevator bellows; by "c" an outlet connecting the valve to the aileron bellows; by "d" an outlet aft of the piston intended for rudder control and in cooperation with outlet "c" the simultaneous and differential action of rudder and ailerons.

In Figs. 17 and 18 then, the wheel shaft 17 can slide back and forth in the tubular shaft 9 on which the gear 10 is secured; two pins 18 fastened to the shaft 9 slide in a slot of the wheel sleeve 19 for back and forth movements and drive the tubular shaft 9 when the wheel rotates. A device composed of a ring 20 moved back and forth by the lever 21 pivoted on the wheel hub and actuated by the pilot fingers allows to limit more or less the backward movement of the shaft 17 and thus limits that of the piston 15 clearing the orifice; this as we said before, accomplishes a simultaneous action of rudder and aileron bellows when desired.

Summarizing we see that when a forward push is given the wheel along with its rotation right or left, we open the orifice in the respective valve part and the impulse applied to the wheel is transmitted to the rudder bellows; if the wheel rotates in any direction without acting back or forth on it, the valve is in neutral position, the orifices "b" are open and the elevator bellows are acted upon. If we pull back on the wheel we open orifices "c" and "d" being that of ailerons and rudder acting together but if by moving with the fingers the device 20—21 aforesaid we limit the backward travel of the piston in clearing only the orifice "c", then we actuate the aileron bellows exclusively. If we suppose that a screw 22 allows to change the limit position of the ring 20 then we have a mean position of the piston 15 and we open more or less the corresponding outlets "c" and "d" for differential distribution of the fluid impulse on rudder and aileron bellows in making that way a quantitative distribution. A spring 23 keeps the valve in neutral position when no push or pull is given the wheel.

If we suppose now that the device 20—21 is set to a piston position such that the outlets "c" and "d" afford different resistances to the fluid flow, the reaction of rudder and aileron control surfaces being proportional to their combined areas, a different state of equilibrium will result. It is evident now that by varying the fluid orifices and also by varying the size and travel of bellows in the various control units, we can obtain a uniform reaction on the steering wheel whatever be the air pressure on the control surfaces; however the angular rotation of the wheel will change.

On same Fig. 16 is shown a tail control arrangement by which the rudder 24 and the elevator 25 are articulated on a single crosslike frame 26, said frame can swivel in a slot made in the fuselage. The fin 27 is also secured to this frame. When we move the elevator bellows, the whole frame swings in the slot for elevator action; the rudder surface is hinged on the vertical member of the frame and moves independently. The fuselage end is tapered in plan view and rounded off in side view. For more strength in the structure, the fin 27 can be a complete half-circle from top to bottom of the vertical member of the frame 26 then the horizontal member is placed in such a way that when swinging vertically and the upper area of the fin diminishes, the lower area increases so that the resultant area of rudder and fin remains constant. This arrangement allows to use three bellows only, say two upper 28 and 29 and one lower 30. For elevator motion the upper bellows act together forth or back with the lower one. For rudder motion the upper bellows 28 and 29 work, the lower one is inactive. The sum of the volumetric displacement of the upper bellows is equal to that of the lower one.

Figure 10:
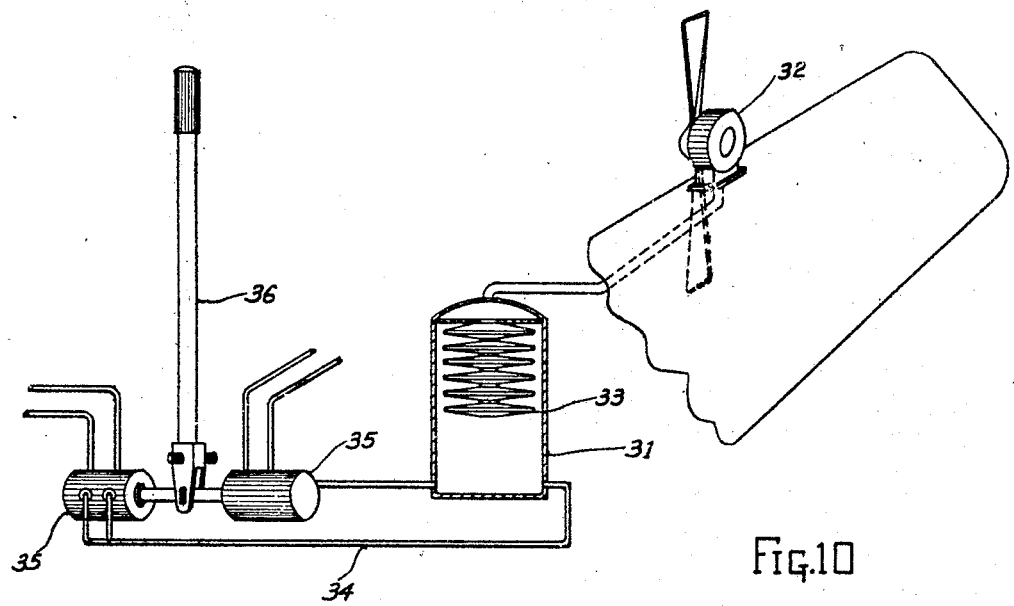
Fig. 10 is a schematic view of a servo-control installation.
Figures 11, 12, 13:
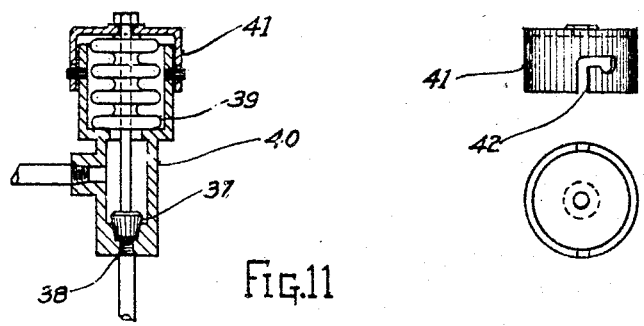
Figs. 11, 12 and 13 show a leak-proof cock specially constructed for use with such controls.

Fig. 10 is relating to the use of leak-proof bellows to realize a fluid servo-control. In the tank 31 some air is compressed by a wind mill or an engine driven compressor 32; the air acting in an expansible body 33 compresses the fluid. A pipe 34 carries this fluid under pressure to the distributing valve 35 similar to that described in Fig. 7; this valve is operated with the lever 36 by the pilot. The fluid transmits its pressure on the respective wing and tail bellows as shown by the hand operated steering gear Fig. 16. As the tightness is the most important feature, no solution of continuity is given the system. To that end a special shut-off cock Figs. 11, 12 and 13 built on the leak-proof principle is deemed necessary. It is composed of a conical or cylindrical plug 37 closing the orifice 38 by up and down displacement; this plug is fastened to a small bellows 39 itself welded or screwed onto the plug seat 40. A shell like handle 41 is free to rotate on the bellows top and a bayonet slot 42 is a locking means to shut the cock. Any other embodiments and modifications can be made on this cock without altering the principle.

In Figs. 14 and 15 is shown a device allowing a differential control of ailerons specially effective in combination with bellows on account of their rectilinear motion. One or two plates 43 in which is cut a wide slot 44 are fastened to the aileron members with various inclinations by the means of holes and clevis bolts 45; these slots work like cams. The bellows rod 46 may have one or two rollers 47 which in its back and forth movements compels the ailerons to bend accordingly. If different settings are made for the two ailerons, we obtain the differential effect desired along with a proportional hinge moment. If the rollers 47 are allowed to come in line with the aileron hinge axis, we so obtain a floating effect of the ailerons.

Other functional embodiments follow from this fluid control principle to mention:

1.—The application of a gauge or manometer to observe the fluid pressure in the pipes and investigate reactions and stresses for laboratory studies and performance computations.

2.—The possibility of combining rudder and brake effects on the ground by connecting a brake bellows unit to the rudder pipe line.

Figure 7:
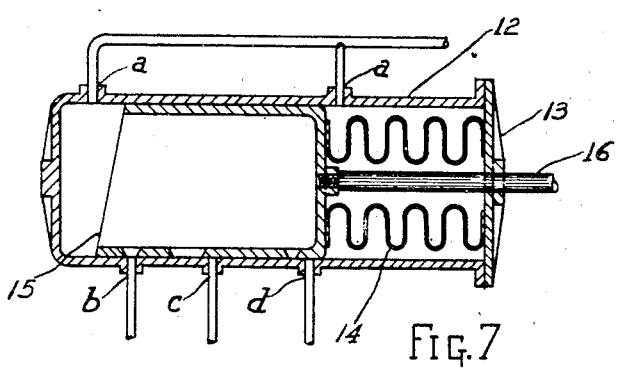
Figs. 7 and 8 are a section and end view of a fluid distributing valve combined with bellows.

3.—The facility to employ a stabilizing device or simply a device preventing the aircraft to stall, said device actuating the secondary bellows thru the use of fluid under pressure and by the means of a valve similar to that shown in Fig. 7.

4.—The simultaneous or separate control of such devices as bomb releasing mechanism, variable pitch propeller and control for engine throttle combined, stabilizer adjustment, wing slot devices etc.

I am aware that prior to this invention there were known devices relating to the use of bellows in different arts and other functions, I therefore limit my claims to the following:

I claim:

1. In combination with an aircraft or vehicle having a fluid control device using expansible and collapsible elements to transmit motions, a steering gear composed of a shaft and a steering wheel transmitting the hand effort to two master bellows, said bellows being connected by the means of a distributing valve and pipes to secondary bellows located in the tail and wings and actuating the control surfaces; the distributing valve being composed of a piston connected to another bellows or resilient element for tightness purpose and sliding in a cylinder, is actioned by back and forth motions of the steering gear shaft in order to open or close corresponding fluid outlets; a spring having for purpose to keep the piston in neutral position and a finger control comprising an abutment ring and a lever to limit the backward displacement of the piston and vary the occlusion of the corresponding outlets, the primary object of this finger control being the conjugation of rudder and ailerons action by differential fluid distribution on their interconnected secondary bellows or resilient elements.

2. In combination with an aircraft having a fluid control device using expansible and collapsible elements to transmit motions, a special arrangement whereby the control surfaces are articulated on a cross-like frame, the fin and rudder swiveling in the vertical plane along with the elevator the fin sliding in a slot made in the fuselage and having the shape of a half-circle so that the exposed area of the vertical part of the tail remains constant, such a tail arrangement allowing to employ three secondary elements instead of four, the two bellows actuating the rudder when acted upon separately being therefore disposed to move the elevator when the fluid pressure is applied to them simultaneously.

3. In combination with an aircraft having a fluid control installation, a device to operate the ailerons by which the rectilinear motion of the bellows rods swings the ailerons up and down, said device being composed of a slotted frame adapted to affect different positions in order to change the inclination of the slot and a roller connected to the bellows rod acting upon said slot with upward or downward pressure; the frame being located in regard to the aileron hinge in such a way that the roller can be put in conjunction with the hinge, so that the ailerons become loose and floating.

4. In combination with an aircraft or vehicle, servo-control installation with fluid under pressure comprising a tank composed of a container having a resilient element fastened to its top, the control fluid being contained in said tank and air being compressed in the resilient element by the means of a compressor driven by the engine or by a windmill; the fluid under pressure being distributed to the tail or wing bellows thru a valve composed of a piston attached to another bellows in order to render the system leak-proof, said piston sliding in a cylinder to close or open corresponding fluid outlets.

5. In combination with an aircraft or vehicle having a fluid control installation, a special shut-off cock or faucet composed of a plug attached to a resilient element for tightness purpose and moving in its housing by sliding movement in order to open or close fluid orifices; a knob having a bayonet slot as a locking means securing said plug on its seat when it is shut.

In testimony whereof I affix my signature.

ALPHONSE HUBERT EVRARD.